US 11,416,604 B2

(12) United States Patent
Palsson et al.

(10) Patent No.: US 11,416,604 B2
(45) Date of Patent: Aug. 16, 2022

(54) ENCLAVE HANDLING ON AN EXECUTION PLATFORM

(71) Applicant: Telefonaktiebolaget LM Ericsson (publ), Stockholm (SE)

(72) Inventors: Lina Palsson, Genarp (SE); Andras Mehes, Vaxholm (SE); Bernard Smeets, Dalby (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 314 days.

(21) Appl. No.: 16/642,360

(22) PCT Filed: Sep. 25, 2017

(86) PCT No.: PCT/EP2017/074251
§ 371 (c)(1),
(2) Date: Feb. 26, 2020

(87) PCT Pub. No.: WO2019/057314
PCT Pub. Date: Mar. 28, 2019

(65) Prior Publication Data
US 2020/0233953 A1 Jul. 23, 2020

(51) Int. Cl.
G06F 21/53 (2013.01)
G06F 21/10 (2013.01)
(Continued)

(52) U.S. Cl.
CPC .......... G06F 21/53 (2013.01); G06F 21/105 (2013.01); G06F 21/57 (2013.01); H04L 9/3234 (2013.01);
(Continued)

(58) Field of Classification Search
CPC ........ G06F 21/53; G06F 21/105; G06F 21/57; G06F 2221/033; G06F 2221/0773; G06F 21/10; H04L 9/3234; G06Q 50/265
See application file for complete search history.

(56) References Cited

U.S. PATENT DOCUMENTS 9,577,829 B1 * 2/2017 Roth ................ G06F 21/60
9,584,517 B1    2/2017 Roth et al.
(Continued)

FOREIGN PATENT DOCUMENTS

WO    2016209548 A1    12/2016

OTHER PUBLICATIONS

Summons to Attend oral Proceedings issued Jan. 31, 2022 in connection with European Application No. 17777234.0, 10 pages.
(Continued)

Primary Examiner — Beemnet W Dada
(74) Attorney, Agent, or Firm — Leffler Intellectual Property Law, PLLC

(57) ABSTRACT

There are provided mechanisms for handling instances of enclaves on an execution platform. The execution platform comprises a secure component. The secure component serves as a trusted interface between a trusted platform module of the execution platform and enclaves of an enclave environment on the execution platform. Only a single enclave, denoted base enclave, in the enclave environment is enabled to communicate with the secure component. A method comprises receiving, by the base enclave, an indication from another enclave in the enclave environment upon start-up of a new instance of the so-called another enclave. The method comprises determining, by the base enclave, to enable continued running of the new instance only when number of currently running instances of the so-called another enclave is within an interval of allowed (Continued)

number of running instances of the so-called another enclave.

20 Claims, 5 Drawing Sheets

(51) Int. Cl.
    *G06F 21/57* (2013.01)
    *H04L 9/32* (2006.01)
    *G06Q 50/26* (2012.01)

(52) U.S. Cl.
    CPC ............... *G06F 2221/033* (2013.01); *G06F 2221/0773* (2013.01); *G06Q 50/265* (2013.01)

(56) References Cited

U.S. PATENT DOCUMENTS

| | | | |
|---|---|---|---|
| 11,138,132 | B2 | 10/2021 | Lal et al. |
| 2012/0159184 | A1 | 6/2012 | Johnson et al. |
| 2014/0006711 | A1* | 1/2014 | Xing ............... G06F 12/10 711/E12.098 |
| 2014/0040890 | A1 | 2/2014 | Novak et al. |
| 2015/0033316 | A1 | 1/2015 | Scarlata et al. |
| 2015/0244735 | A1 | 8/2015 | Kumar et al. |
| 2016/0149912 | A1 | 5/2016 | Scott-Nash et al. |
| 2016/0380985 | A1 | 12/2016 | Chhabra et al. |
| 2017/0185776 | A1 | 6/2017 | Robinson et al. |
| 2018/0183578 | A1* | 6/2018 | Chakrabarti ......... H04L 9/0861 |
| 2018/0183580 | A1* | 6/2018 | Scarlata ............... H04L 9/3247 |
| 2018/0212966 | A1* | 7/2018 | Costa .................. H04L 63/18 |
| 2018/0330092 | A1 | 11/2018 | Sniezek et al. |
| 2020/0175208 | A1 | 6/2020 | Yu et al. |
| 2020/0374262 | A1 | 11/2020 | Hoewisch et al. |
| 2021/0365529 | A1 | 11/2021 | Baldwin et al. |

OTHER PUBLICATIONS

Unknown, "Intel Software Guard Extensions Developer Guide", 2016, XP055876760, retrieved from the Internet Jan. 7, 2022, URL:https://01.org/sites/default/files/documentation/intel_sgx_developer_guide_pdf.pdf, 34 pages.

Mechalas, John P., "Properly Detecting Intel Software Guard Extensions (Intel SGX) in Your Applications", Aug. 8, 2017, XP055876757, retrieved from the internet Jan. 7, 2022, URL:https://www.intel.com/content/www/us/en/developer/articles/technical/properly-detecting-intel-software-guard-extensions-inyour-applications.html, 12 pages.

PCT International Search Report, dated Jun. 13, 2018, in connection with International Application No. PCT/EP2017/074251, all pages.

PCT Written Opinion, dated Jun. 13, 2018, in connection with International Application No. PCT/EP2017/074251, all pages.

Ahmad Atamli-Reineh et al., "A framework for application partitioning using trusted execution environments", Concurrency and Computation: Practice and Experience, Apr. 23, 2017, Wiley Online Library (wileyonlinelibrary.com), pp. 1-23.

Ming-Wei Shih et al., "S-NFV: Securing NFV states by using SGX", https://taesoo.gtisc.gatech.edu/pubs/2016/shih:snfv.pdf, 2016, 4 pages.

PCT International Search Report, dated Nov. 2, 2018, in connection with International Application No. PCT/EP2018/057808, all pages.

PCT Written Opinion, dated Nov. 2, 2018, in connection with International Application No. PCT/EP2018/057808, all pages.

PCT International Search Report, dated Oct. 29, 2018, in connection with International Application No. PCT/EP2018/057807, all pages.

PCT Written Opinion, dated Oct. 29, 2018, in connection with International Application No. PCT/EP2018/057807, all pages.

M. Dalheimer et al., "GenLM: License Management for Grid and Cloud Computing Environments", 9th IEEE/ACM International Symposium on Cluster Computing and the Grid, May 18, 2009, Piscataway, NJ, USA, pp. 132-139.

S. Matetic et al., "ROTE: Rollback Protection for Trusted Execution", accessed Jun. 29, 2017, 19 pages.

Notice of Allowance dated Apr. 15, 2022 in connection with U.S. Appl. No. 17/040,625, 22 pages.

* cited by examiner

ENCLAVE HANDLING ON AN EXECUTION PLATFORM

TECHNICAL FIELD

Embodiments presented herein relate to a method, an execution platform, a computer program, and a computer program product for handling instances of enclaves on the execution platform.

BACKGROUND

Network equipment and functions performed on such network equipment are increasingly delivered as (micro) services that are implemented by software that runs on a generic hardware or virtualized hardware platform, using standard platform technologies.

So-called enclaves offer the possibility to have services running in hardware owned by the licensee without the licensee being able to extract data from an enclave when the enclave is running or when the enclave is not running and saved for later restart.

But whereas in hardware based platforms there are mechanisms that enable control and/or limitation of the number of instances of a certain program to execute on the platform, any number of instances of an enclave comprising a (micro)service might be started on the platform. Only practical limitations, such as memory size limitations, limit the number of concurrent instances of one and the same enclave.

Thus, since the enclaves generally are started from the operating system which is under control of the licensee, the licensee is enabled to start multiple instances of one and the same enclave. Even if there is no direct way to make changes to the enclave state directly from the outside the enclave, the licensee may gain benefit from starting an additional instance of an enclave.

Hence, there is still a need for improved handling of instances of an enclave.

SUMMARY

An object of embodiments herein is to provide efficient handling of instances of an enclave, that, for example, enables control of how many instances of the enclave are allowed to be running.

According to a first aspect there is presented a method of handling instances of enclaves on an execution platform. The execution platform comprises a secure component. The secure component serves as a trusted interface between a trusted platform module of the execution platform and enclaves of an enclave environment on the execution platform. Only a single enclave, denoted base enclave, in the enclave environment is enabled to communicate with the secure component. The method comprises receiving, by the base enclave, an indication from another enclave in the enclave environment upon start-up of a new instance of the so-called another enclave. The method comprises determining, by the base enclave, to enable continued running of the new instance only when number of currently running instances of the so-called another enclave is within an interval of allowed number of running instances of the so-called another enclave.

According to a second aspect there is presented an execution platform for handling instances of enclaves on the execution platform. The execution platform comprises a secure component. The secure component serves as a trusted interface between a trusted platform module of the execution platform and enclaves of an enclave environment on the execution platform. Only a single enclave, denoted base enclave, in the enclave environment is enabled to communicate with the secure component. The execution platform further comprises processing circuitry. The processing circuitry is configured to cause the execution platform to receive, by the base enclave, an indication from another enclave in the enclave environment upon start-up of a new instance of the so-called another enclave. The processing circuitry is configured to cause the execution platform to determine, by the base enclave, to enable continued running of the new instance only when number of currently running instances of the so-called another enclave is within an interval of allowed number of running instances of the so-called another enclave.

According to a second aspect there is presented an execution platform for handling instances of enclaves on the execution platform. The execution platform comprises a secure component. The secure component serves as a trusted interface between a trusted platform module of the execution platform and enclaves of an enclave environment on the execution platform. Only a single enclave, denoted base enclave, in the enclave environment is enabled to communicate with the secure component. The execution platform further comprises processing circuitry and a storage medium. The storage medium stores instructions that, when executed by the processing circuitry, cause the execution platform to perform operations, or steps. The operations, or steps, cause the execution platform to receive, by the base enclave, an indication from another enclave in the enclave environment upon start-up of a new instance of the so-called another enclave. The operations, or steps, cause the execution platform to determine, by the base enclave, to enable continued running of the new instance only when number of currently running instances of the so-called another enclave is within an interval of allowed number of running instances of the so-called another enclave.

According to a second aspect there is presented an execution platform for handling instances of enclaves on the execution platform. The execution platform comprises a secure component. The secure component serves as a trusted interface between a trusted platform module of the execution platform and enclaves of an enclave environment on the execution platform. Only a single enclave, denoted base enclave, in the enclave environment is enabled to communicate with the secure component. The execution platform further comprises a receive module configured to cause the base enclave to receive an indication from another enclave in the enclave environment upon start-up of a new instance of the so-called another enclave. The execution 3o platform further comprises a determine module configured to cause the base enclave to determine to enable continued running of the new instance only when number of currently running instances of the so-called another enclave is within an interval of allowed number of running instances of the so-called another enclave.

According to a fifth aspect there is presented a computer program for handling instances of enclaves on an execution platform, the computer program comprising computer program code which, when run on the execution platform, causes a method according to the first aspect to be performed on the execution platform.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these execution platforms, this computer program, and this computer program product provide efficient handling of instances of an enclave.

Advantageously this method, these execution platforms, this computer program, and this computer program product enable control of how many instances of the enclave are allowed to be running.

Advantageously this method, these execution platforms, this computer program, and this computer program product enable the number of instances of an application containing an enclave to be upper limited in a manner as the enclave provider wants without the need of online connection between the enclave and the enclave provider, or a third party trusted by the enclave provider.

Advantageously this method, these execution platforms, this computer program, and this computer program product enable implementation of license control functionality with enclaves, where capping the number of executing instances is often an essential characteristic of a received license for a service/program.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

Figure 1:
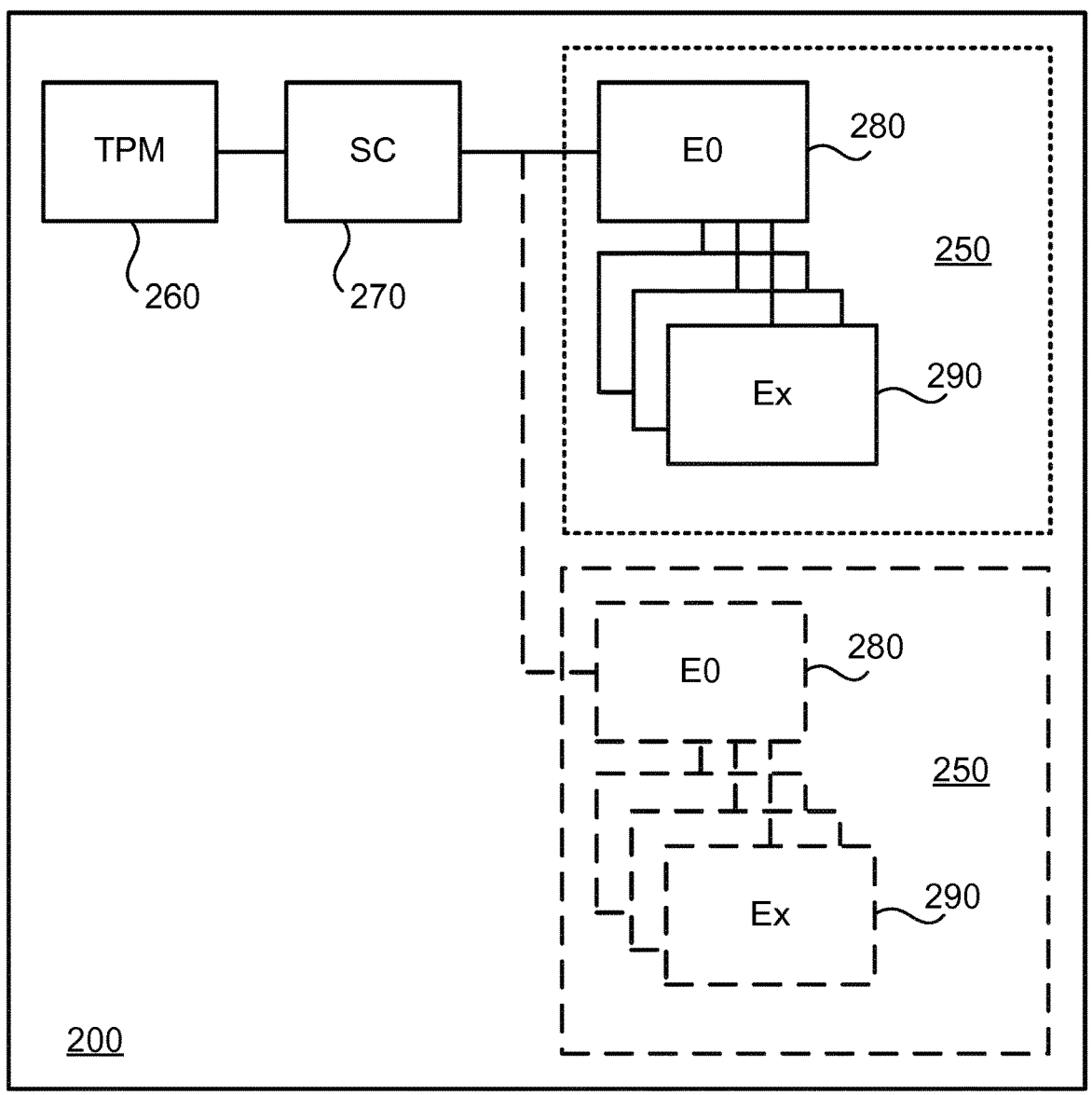
FIG. 1 is a schematic diagram illustrating an execution platform according to an embodiment.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The herein disclosed embodiments are based on having a secure component outside an enclave environment to assist in the control of the number of instances per enclaves run on an execution platform 200. A base enclave is controlling the number of instances of other enclaves in the enclave environment and the base enclave is controlled by this secure component. In this respect, the enclave environment represents the set of enclaves on the execution platform 200 and the features of the execution platform 200 needed to create and operate enclaves. Thus, in other words, the enclaves of an enclave environment could be regarded as defining an enclave control group, where the base enclave controls the number of instances of each enclave in the enclave control group.

In general terms, a Trusted Platform Module (TPM) might be defined as a hardware cryptographic module that is enabled to securely store sensitive data and perform various cryptographic operations. Authentication (a process to prove the identity attribute of an entity, i.e. the TPM acting as the integrity reporting entity) and attestation (a process that enables the software integrity state to be reported and verified in order to determine its trustworthiness) are some steps that might be performed to ensure trusted computing. A TPM can authenticate itself using the credentials stored in 3o shielded memory and provide integrity measurements reports to prove that software is trustworthy. The nature of a TPM's shielded memory ensures that information may be stored and protected from external software attacks. A variety of applications storing data and secrets protected by a TPM can be developed. These applications make it much harder to access information on a computing platform without proper authorization. If the software configuration of a platform has changed as a result of unauthorized activities, access to such data and secrets can be denied. Various TPM specifications exist. TPMs can provide a hardware root of trust on a hosting service platform, and can be leveraged for operations such as measured boot and attestation.

Assume an execution platform 200 using a TPM based boot control technology. Assume further that on this execution platform 200, enclaves will execute. All firmware and software up to, and including, the kernel is measured to platform configuration registers (PCRs) using the TPM based boot control technology, such as found in Unified Extensible Firmware Interface (UEFI) boot technology. This enables a controlled observation of the kernel and by proper configuration of the boot process to allow only approved software to be booted, it can be considered as trusted by performing measurements of the values in the PCR and comparing the measurements to known, trustworthy values. This means that an enclave provider can let an enclave hold a whitelist of trustworthy values of a configuration and then let the enclave only accept configurations included in this whitelist. The configuration itself might, for instance, be provided by the enclave provider to the platform provider.

In this respect, the term enclave as used herein could be regarded as short for hardware-mediated execution enclave. The enclave might generally be defined as an area of process space and memory within a system environment, such as an execution platform 200, within a computer host which delivers confidentiality and integrity of instructions and data associated with that enclave. This enclave is protected from eavesdropping, replay and alteration attacks as the programs within the enclave are executed. An enclave is considered capable of executing processes, and executable code can be loaded into it. Various capabilities may be provided by such an enclave, but at minimum, the following might be enabled: the ability for executable software to be loaded into the enclave, the ability for the host to attest to the integrity of the executable code prior to execution, and the ability to load data into the enclave. The ability to execute software within the enclave without other processes on the computer host being able to inspect, alter or replay the instructions or associated data. Note that these protections are not just against unprivileged processes, but also against the TPM and hypervisor processes which may be running at an escalated privilege level.

A secure component (SC) is running on the execution platform 200. The secure component might be a software component that is the only access point to the TPM. This could be achieved by letting the secure component be a part of the kernel and limit TPM access to so-called ring O. Another way to achieve this is to keep the secure component outside the kernel. The TPM access can then instead be restricted for instance by using a mandatory access control (MAC) approach. The MAC policy can for example be controlled using some integrity measurement tool, for instance using so-called Integrity Measurement Architecture (IMA). The secure component itself might also need to be controlled in some way, and this can also be achieved by using an integrity measurement provided by IMA. Prevention of uncontrolled updating of the secure component might also be needed. The secure component might then be considered trusted and integrity protected.

Figure 2:
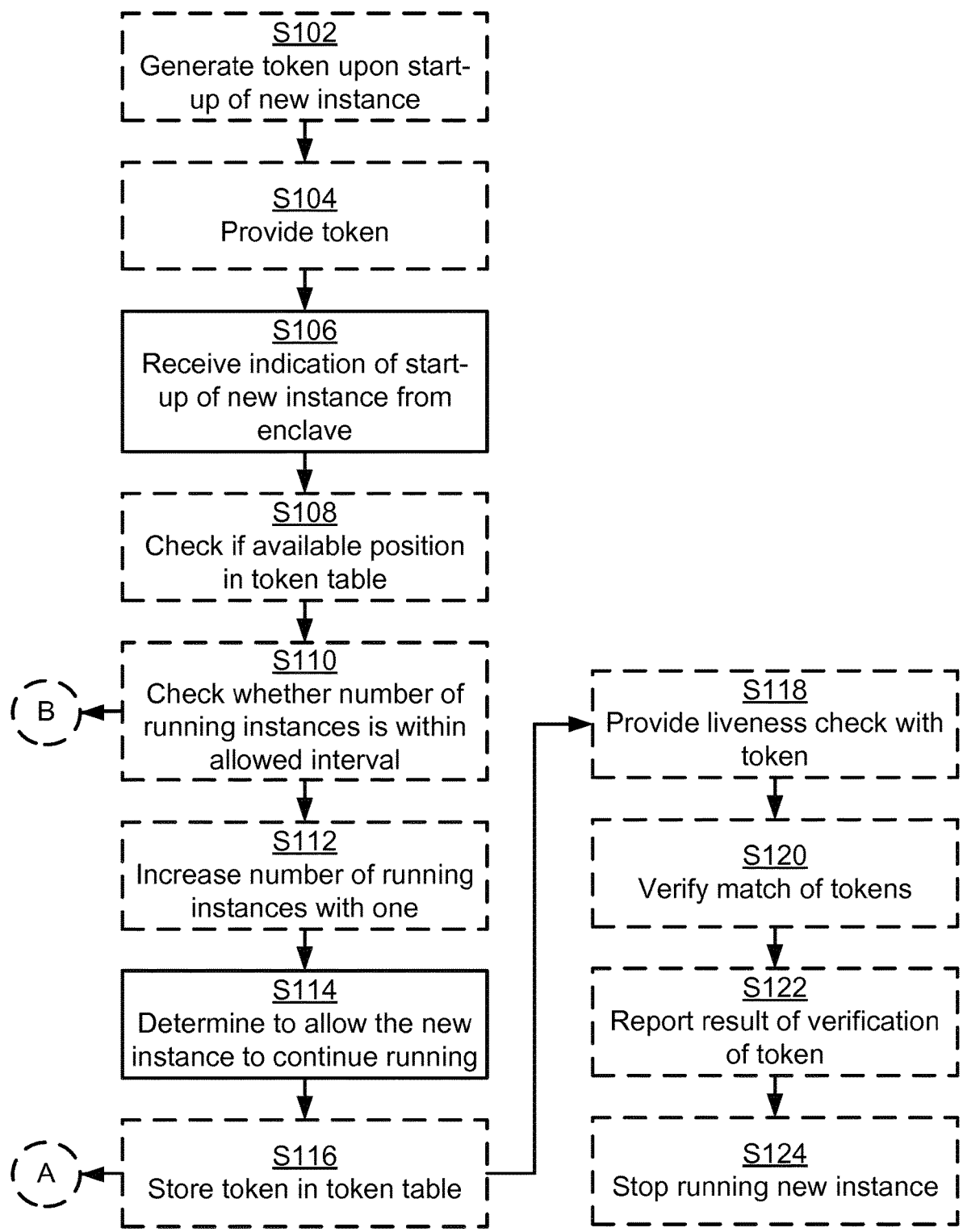
FIG. 2 is a flowchart of methods according to embodiments.
Figure 2:
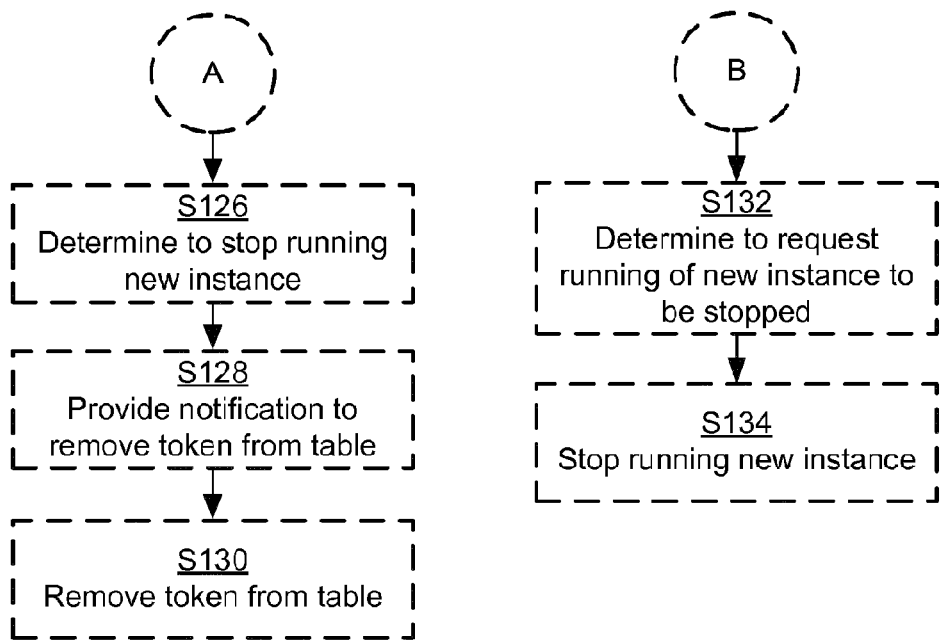

Reference is now made to FIG. 1 illustrating an execution platform 200 according to an embodiment. The execution platform 200 comprises a secure component 270. The secure component serves as a trusted interface between a trusted platform module 260 of the execution platform 200 and enclaves 280, 290 of an enclave environment 250 on the execution platform. Only a single enclave, denoted base enclave (E0), in the enclave environment is enabled to communicate with the secure component. As illustrated in FIG. 2, there might be one or more enclave environments 250 on the execution platform, each having its own base enclave 280, and with one and the same secure component serving as the trusted interface; the herein disclosed embodiments are not limited to any particular number of enclave environments 250 or enclaves per enclave environment 250, as long as there is one base enclave per enclave environment 250.

Reference is now made to FIG. 2 illustrating a method for handling instances of enclaves on an execution platform 200 as performed on the execution platform 200 according to an embodiment.

In general terms, the base enclave is configured to control the number of instances of all the other enclaves (denoted Ex in FIG. 1) in the enclave environment (possibly from the same application vendor; AV) that run on the execution platform 200. In order to do so the execution platform 200 is configured to perform steps S106, S114:

S106: The base enclave in the execution platform 200 receives an indication from another enclave in the enclave environment upon start-up of a new instance of the so-called another enclave.

S114: The base enclave in the execution platform 200 determines to enable continued running of the new instance only when the number of currently running instances of the so-called another enclave is within an interval of allowed number of running instances of the so-called another enclave.

The secure component outside the enclave environment together with the base enclave thereby provide a control functionality which enables an application provider of the enclaves to restrict the number of allowed running instances of each of the enclaves running on the execution platform 200.

Embodiments relating to further details of handling instances of enclaves on an execution platform 200 as performed by on the execution platform 200 will now be disclosed.

As disclosed above, only the base enclave is enabled to communicate with the secure component.

In this respect, in some aspects the secure component only accepts enclave communications (i.e. communications between the base enclave and outside the enclave environment) via a secure channel to the base enclave. That is, according to an embodiment all communications to the base enclave from the execution platform outside the enclave environment is directed via the secure component.

Further in this respect, the base enclave in some aspects is the only enclave in the enclave environment that can communicate with the secure component (that, in turn, is enabled to communicate to the TPM). Thus, according to an embodiment the base enclave is the only enclave of the enclave environment that is enabled to communicate with the secure component. As a consequence thereof, all enclaves in the enclave environment will need to communicate with the base enclave at start, since the base enclave is the only enclave that is enabled to communicate with the secure component (that is enabled to communicate with the TPM).

In some aspects the base enclave is hosted by a base application and the secure component ensures that there is one base enclave per base application. That is, according to an embodiment the secure component enforces that there is only one base enclave per application hosted by the execution platform. However, in other aspects one and the same base enclave is used to control instances of enclaves that belong to different applications.

In some aspects only one instance of the secure component is allowed on the execution platform 200. This can be achieved by, for instance, letting the secure component itself check if there is a copy running or letting the kernel control that only one secure component exists. The secure component might check that it is not running in a container, and that only one namespace is allowed to prevent that another instance of the secure component is hidden in another namespace.

There may be different ways to check whether the number of currently running instances of the so-called another enclave is within an interval of allowed number of running instances.

In some aspects there is an explicit check of the number of currently running instance of the so-called another enclave. Hence, according to an embodiment the execution platform 200 is configured to perform (optional) step S110:

S110: The base enclave in the execution platform 200 checks whether the number of currently running instances of the so-called another enclave is within the interval or not before determining to enable continued running of the new instance.

In some aspects the record of number of running instances of the so-called another enclave is updated when the number of currently running instances of the so-called another enclave indeed is within the interval. Thus, according to an embodiment the execution platform 200 is configured to perform (optional) step S112 upon enabling running of the new instance:

S112: The base enclave in the execution platform 200 increases the number of currently running instances of the so-called another enclave with one.

In some aspects, when the number of currently running instances of the so-called another enclave is not within the interval the new instance is to be stopped. Particularly, according to an embodiment the execution platform 200 is configured to perform (optional) step S132 upon not enabling running of the new instance:

S132: The base enclave in the execution platform 200 determines to request the running of the new instance to be stopped or at least limited. In this respect, the instance will not be able to perform and complete its intended functionality, e.g., a request issued by the new instance will not be executed to but instead result in an error message being generated.

Upon receiving the request from the base enclave the so-called another enclave then stops, or at least limits, the execution of the new enclave. Thus, according to an embodiment the execution platform 200 is configured to perform (optional) step S134:

S134: The so-called another enclave in the execution platform 200 stops running of the new instance in response to having received the request to stop running the new instance, or in absence of receiving an indication to continue running the new instance.

There could be further different ways to check whether the number of currently running instances of the so-called another enclave is within an interval of allowed number of running instances.

In some aspects, at start-up of a new instance, the so-called another enclave creates a token, such as a random number, or a nonce, or timestamp, which is sent to the base enclave. Particularly, according to an embodiment the execution platform 200 is configured to perform (optional) steps S102, S104:

S102: The so-called another enclave in the execution platform 200 generates a token upon start-up of the new instance.

S104: The so-called another enclave in the execution platform 200 provides the token to the base enclave.

The base enclave might then check if the token is already present in a token table of the so-called another enclave. That is, each another enclave of the enclave environment might have its own token table at the base enclave. Particularly, according to an embodiment the execution platform 200 is configured to perform (optional) step S108:

S108: The base enclave in the execution platform 200 checks in a token table for the so-called another enclave whether there is at least one position in the token table that is currently not occupied by another token or not.

According to an embodiment the checking whether there is at least one position in the token table that is currently not occupied by another token or not is part of checking whether the number of currently running instances of said another enclave is within the interval or not.

If a free position for is found in the token table for the so-called another enclave, then the base enclave might store the token. That is, according to an embodiment the execution platform 200 is configured to perform (optional) step S116:

S116: The base enclave in the execution platform 200 stores the token in the token table when there is at least one position in the token table that is currently not occupied by another token.

If a free position is not found, the base enclave informs the so-called another enclave to stop its execution of the new instance. That is, according to an embodiment the base enclave determines to request the running of the new instance to be stopped when all positions in the token table currently are occupied by other tokens.

Further, during run-time, or execution of the new instance, the so-called another enclave might periodically send its token to the base enclave as part of a liveness check. The base enclave might then check if the received token matches a token in the token table and might provide a report thereof to the so-called another enclave. Thus, according to an embodiment the execution platform 200 is configured to perform (optional) steps S118-S122.

S118: The so-called another enclave in the execution platform 200 provides a liveness check to the base enclave when the so-called another enclave is running the instance. The liveness check comprises the token.

S120: The base enclave in the execution platform 200 verifies whether the token of the liveness check matches any token in the token table or not.

S122: The base enclave in the execution platform 200 reports a result of the verifying to the so-called another enclave.

Then, if the token does not match any stored token in the token table, the response instructs the so-called another enclave to stop executing, or running, the new instance. That is, according to an embodiment the execution platform 200 is configured to perform (optional) step S124:

S124: The so-called another enclave in the execution platform 200 stops running of the new instance when the result indicates that the token of the liveness check did not match any token in the token table.

In some aspects, the so-called another enclave informs the base enclave when the so-called another enclave is to stop running, or executing, the new instance. The base enclave might then remove the token from the token table and mark its position in the token table as free. Particularly, according to an embodiment the execution platform 200 is configured to perform (optional) steps S126-S130:

S126: The so-called another enclave in the execution platform 200 determines to stop running the new instance.

S128: The so-called another enclave in the execution platform 200 provides a notification to the base enclave to remove the token from the token table in response thereto.

S130: The base enclave in the execution platform 200 removes the token from the token table.

In some aspects, the token is generated by the base enclave, by the secure component, or by the TPM as requested by the so-called another enclave. The so-called another enclave could request the token to be generated by providing a start-up timestamp or a short-lived initial check-in token to the base enclave. The token is then provided to the so-called another enclave. Step S108 can then be entered and the same procedure as disclosed above relating to the token will then follow.

Figure 3:
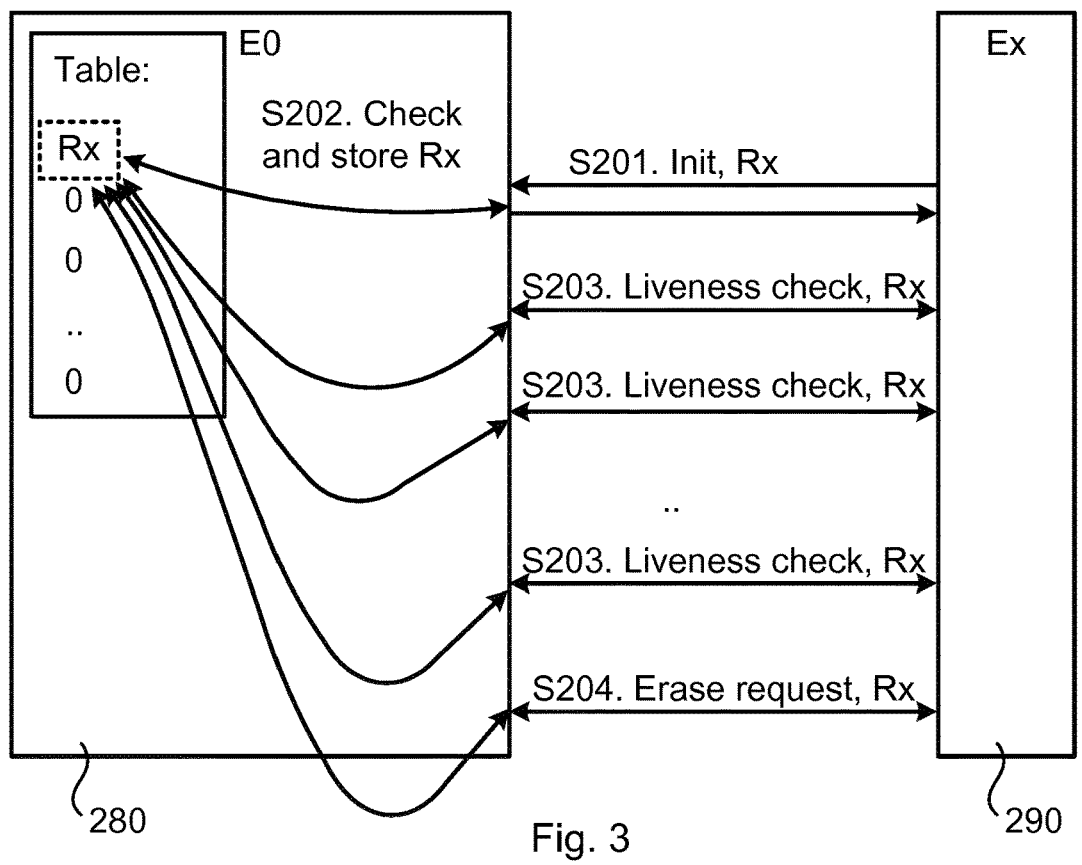
FIG. 3 schematically illustrates storing and checking tokens during the lifetime of an instance according to an embodiment.

Reference is now made to FIG. 3 schematically illustrating storing and checking tokens during the lifetime of an instance of the so-called another enclave according to a particular embodiment based on at least some of the above embodiments.

Let N, where N>0 is an integer and represents the maximal allowed instances of the so-called another enclave Ex. Assume that the base enclave E0 has access to a table with N positions for Ex with all N positions initially marked as free, for instance by setting their value to 0. Integrity protected communication between Ex and E0 might be used and freshness of the messages communicated between Ex and E0 must be guaranteed, for instance by using a nonce. During the lifetime of an instance of Ex, the below steps are performed in order to control that the maximal allowed number of instances of Ex is not exceeded.

S201: At startup of a new instance of Ex, a token Rx is generated and sent to E0.

S202: E0 is checks its token table for E0 and, if a free position is found, stores the value of Rx. If no free position is found, E0 informs Ex and Ex stops its running, at least partly, of the new instance.

S203: During run-time, as a form of liveness check, Ex periodically sends the token Rx of the instance to E0, and E0 will check if it matches a value in the token table. E0 will report to Ex with a response. If Rx does not match any token in the token table, the response will make Ex stop running, or executing, the instance.

S204: When the instance of Ex is to be terminated, Ex sends a command to E0 to erase the token of the instance from the token table and the position in the token table will thus again be marked as free.

If the instance of Ex is shut down in an uncontrolled way, step S204 might not be performed, and the token will remain in the token table of E0. The token in the token table in this case thus represents a dead value. To get rid of this dead value, E0 might be configured to erase a token in the token table if no liveness check was performed for a predefined amount of time.

Figure 4:
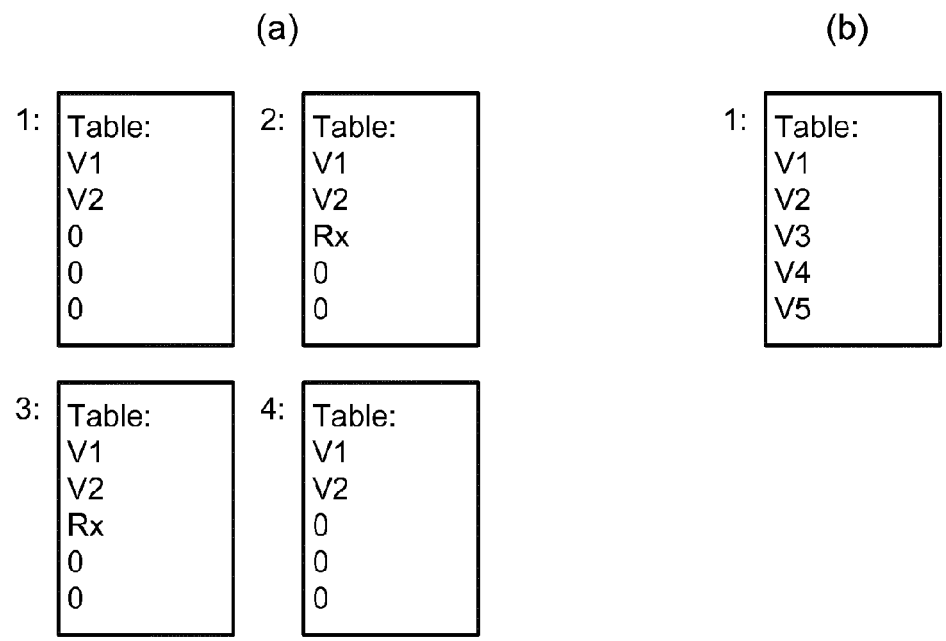
FIG. 4 schematically illustrates content of a token table in a base enclave according to an embodiment.

An example of content of a token table in E0 for Ex after each step S201-S204 is illustrated in FIG. 4. V1, V2, V3, V4, V5 are values (different from 0) of tokens used by respective instances of Ex. In the example of FIG. 4, N=5 instances of Ex are allowed. In FIG. 4(*a*) is illustrated a successful run of a new instance of Ex, and in FIG. 4(*b*) is illustrated failing of a run of a new instance of Ex.

According to another embodiment, Ex is timely, or before executing certain functionality, sending the liveness check to E0 and continues execution only after receiving a response, such as an acknowledgement, from E0 to continue. In that way E0 could know how many instances of Ex are currently running, or executed, or at least the capacity of the summary of the instances of Ex by checking the intensity (i.e. he frequency of occurrence) of the liveness check from Ex; the more often the liveness check occurs, the more instanced might be running, or executed.

According to an embodiment the base enclave is initialized with the secure component before receiving the indication from the so-called another enclave.

Figure 5:
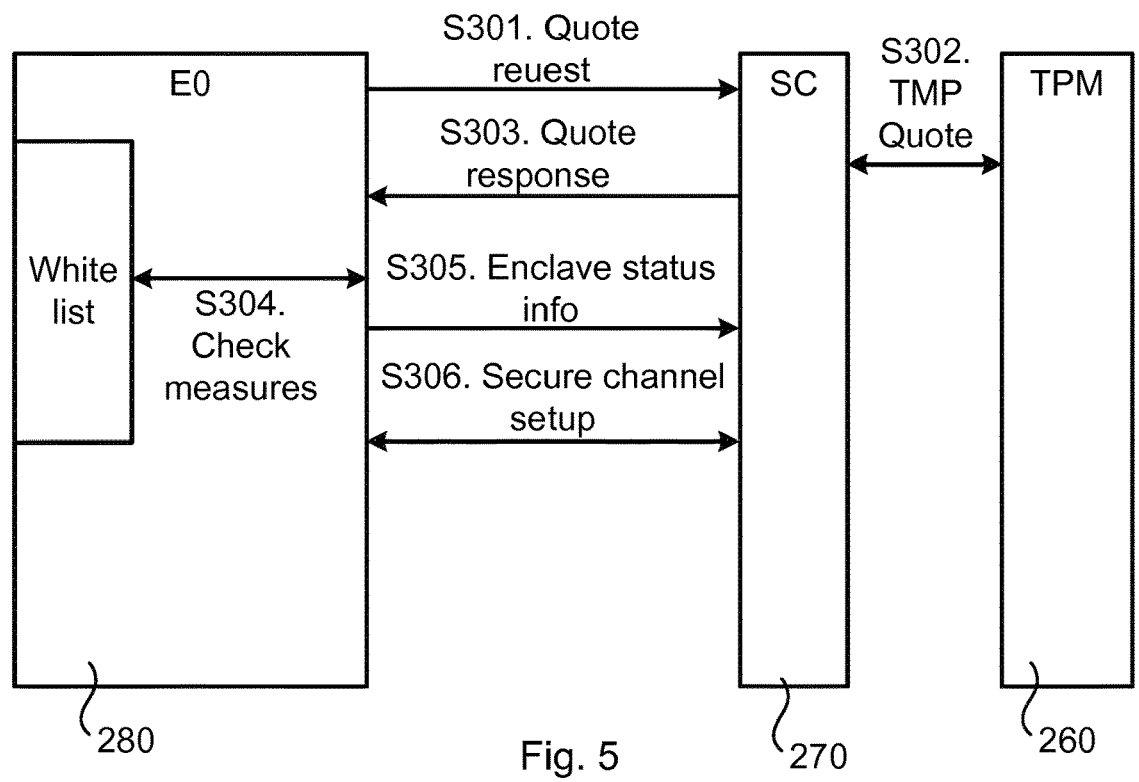
FIG. 5 schematically illustrates initialization of a base enclave according to an embodiment.

Further aspects of the initialization of the base enclave will now be provided with reference to FIG. 5. FIG. 5 schematically illustrates initialization of a base enclave.

As disclosed above, the base enclave might be provided by an application vendor (AV). The application vendor might deliver the base enclave as signed by the application vendor and provisioned with at least one whitelist. Such a whitelist might comprise trustworthy PCR digests and IMA log values. The base enclave might be delivered as a part of a base application A0, handling all the communications with the base enclave; all communications with other enclaves of the base application, as well as communications with the secure component.

An embodiment for initializing the base enclave will now be disclosed.

S301: The base enclave generates a quote request and sends the quote request to the secure component.

S302: The secure component requests a TPM quote from the TPM.

S303: The result of the TPM quote is sent to the base enclave together with required certificates, such as key certificates, and logs, such as IMA logs.

S304: The base enclave evaluates the signing of the TPM quote and then compares the PCR digest against a whitelist that the base enclave possesses. Possible additional integrity measurements, such as IMA measurements, might also be verified, for instance against PCR values, and additional logs, such as IMA logs, might be checked against a whitelist.

S305: The base enclave provides status information of the checks in step S304 to the secure component. If all checks pass, the base enclave will continue the initialization, and otherwise the base enclave will stop the initialization.

S306: A secure channel is established between the secure component and the base enclave. The secure channel is integrity protected but not necessarily confidentiality protected. The secure channel will then only accept further enclave communication via this secure channel to the base enclave. This means that a potential other enclave, possibly imitating the base enclave, will not be able to communicate with the secure component over the secure channel.

When the base enclave is running, or executing, it will communicate with the secure component. If the base enclave is no longer able to communicate with the secure component the base enclave will stop running, or executing.

There are two cases when the base enclave has direct TPM access; either the TPM is a discrete TPM, or it is a firmware TPM. In the latter case, it is possible to make sure that the used TPM is located on the same hardware as the base enclave. For a discrete TPM a platform certificate, as defined by the Trusted Computing Group (TCG), is needed to bind the TPM to the chipset and motherboard. In that way, the state of the execution platform 200 in which the base enclave is running, or executing, can also be verified, which can have security advantages.

In the case where the enclave can have TPM access, in step S304 the base enclave might perform an internal quote to the TPM and the result will be compared with the external quote. If they are not matching, the base enclave will stop running, or executing.

When using a firmware TPM, assurance that the base enclave is placed on the same hardware as the TPM might further be achieved by checking that the Enhanced Privacy Identification (EPID) used to anchor the attestation is issued for the same hardware as the TPM Endorsement Key (EK) certificate is issued for.

While the embodiments thus far have been described using a TPM, the same required functionality can be achieved by other means, such as using so-called Trustzone based, secure (measured) boot of the software.

Figure 6:
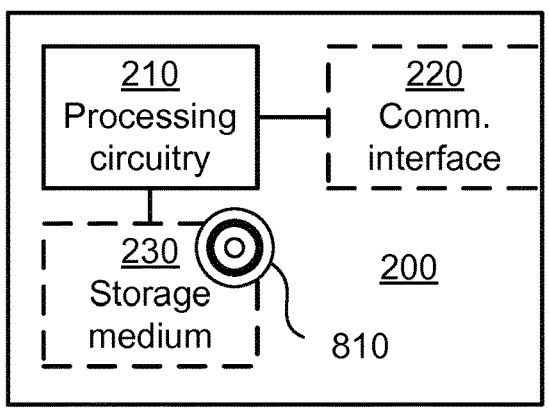
FIG. 6 is a schematic diagram showing functional units of an execution platform according to an embodiment.

FIG. 6 schematically illustrates, in terms of a number of functional units, the components of an execution platform 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the execution platform 200 to perform a set of operations, or steps, S102-S134, as disclosed above. For example, the storage medium 230 may store the set of operations, and the processing circuitry 210 may be configured to retrieve the set of operations from the storage medium 230 to cause the execution platform 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The execution platform 200 may further comprise a communications interface 220 at least configured for communications with other entities, nodes, functions, and devices. As such the communications interface 220 may comprise one or more transmitters and receivers, comprising analogue and digital components. The processing circuitry 210 controls the general operation of the execution platform 200 e.g. by sending data and control signals to the communications interface 220 and the storage medium 230, by receiving data and reports from the communications interface 220, and by retrieving data and instructions from the storage medium 230. Other components, as well as the related functionality, of the execution platform 200 are omitted in order not to obscure the concepts presented herein.

Figure 7:
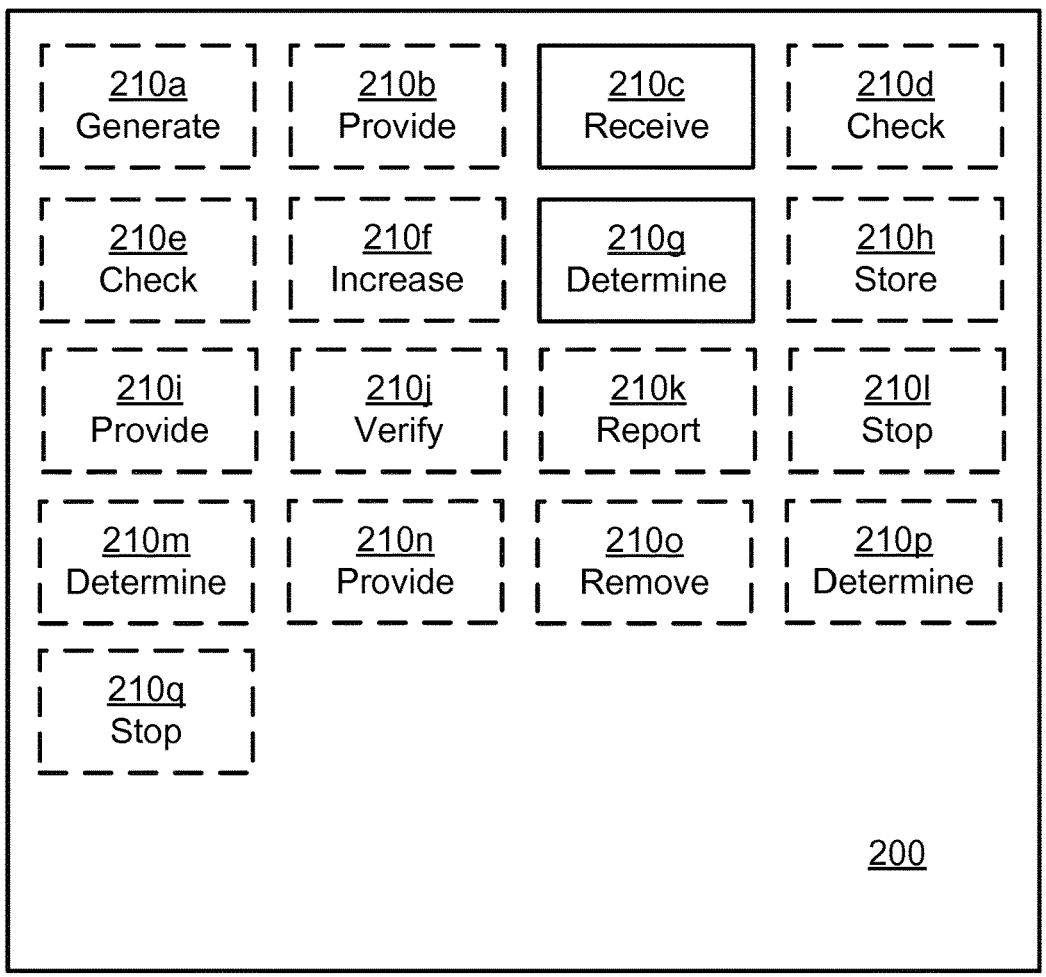
FIG. 7 is a schematic diagram showing functional modules of an execution platform according to an embodiment.

FIG. 7 schematically illustrates, in terms of a number of functional modules, the components of an execution platform 200 according to an embodiment. The execution platform 200 of FIG. 7 comprises a number of functional modules; a receive module 210C configured to perform step S106 and a determine module 210g configured to perform step S114. The execution platform 200 of FIG. 7 may further comprise a number of optional functional modules, such as any of a generate module 210a configured to perform step S102, a provide module 210b configured to perform step S104, a check module 210d configured to perform step S108, a check module 210e configured to perform step S110, an increase module 210f configured to perform step S112, a store module 210h configured to perform step S116, a provide module 210i configured to perform step S118, a verify provide module 210j configured to perform step S120, a report module 210k configured to perform step S122, a stop module 210l configured to perform step S124, a determine module 210m configured to perform step S126, a provide module Zion configured to perform step S128, a remove module 2100 configured to perform step S130, a determine module 210p configured to perform step S132, and a stop module 210q configured to perform step S134.

In general terms, each functional module 210a-210q may in one embodiment be implemented only in hardware and in another embodiment with the help of software, i.e., the latter embodiment having computer program instructions stored on the storage medium 230 which when run on the processing circuitry makes the execution platform 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210q may be implemented by the processing circuitry 210, possibly in cooperation with the communications interface 220 and/or the storage medium 230. The processing circuitry 210 may thus be configured to from the storage medium 230 fetch instructions as provided by a functional module 210a-210q and to execute these instructions, thereby performing any steps as disclosed herein.

Figure 8:
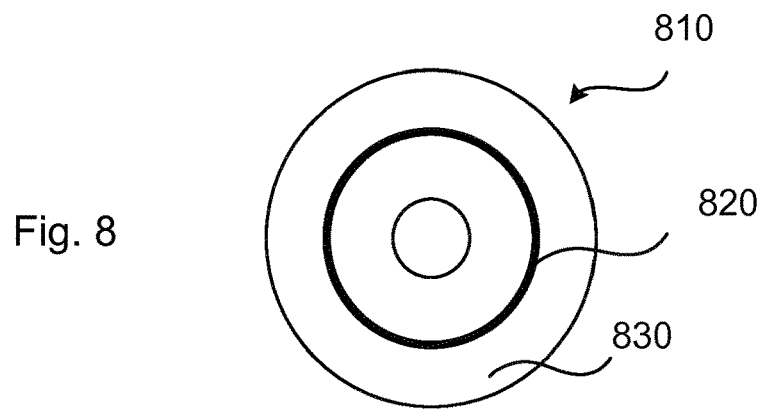
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method of handling instances of enclaves on an execution platform, the execution platform comprising a secure component, the secure component serving as a trusted interface between a trusted platform module of the execution platform and enclaves of an enclave environment on the execution platform, wherein only a single enclave, denoted base enclave, in the enclave environment is enabled to communicate with the secure component, the method comprising:
   receiving, by the base enclave, an indication from another enclave in the enclave environment upon start-up of a new instance of said another enclave; and
   determining, by the base enclave, to enable continued running of the new instance only when a number of currently running instances of said another enclave is within an interval of allowed number of running instances of said another enclave.

2. The method according to claim 1, further comprising:
   checking, by the base enclave, whether the number of currently running instances of said another enclave is within said interval or not before determining to enable continued running of the new instance.

3. The method according to claim 1, further comprising, upon enabling running of the new instance:
   increasing, by the base enclave, number of currently running instances of said another enclave with one.

4. The method according to claim 1, further comprising, upon not enabling running of the new instance:
   determining, by the base enclave, to request the running of the new instance to be stopped or at least limited.

5. The method according to claim 4, further comprising:
stopping, by said another enclave, running of the new instance in response to having received the request to stop running the new instance, or in absence of receiving an indication to continue running the new instance.

6. The method according to claim 1, further comprising:
generating, by said another enclave and upon start-up of the new instance, a token; and
providing, by said another enclave, the token to the base enclave.

7. The method according to claim 6, further comprising:
checking, by the base enclave and in a token table for said another enclave, whether there is at least one position in the token table that is currently not occupied by another token or not.

8. The method according to and claim 7, further comprising:
checking, by the base enclave, whether the number of currently running instances of said another enclave is within said interval or not before determining to enable continued running of the new instance,
wherein said checking whether there is at least one position in the token table that is currently not occupied by another token or not is part of checking whether the number of currently running instances of said another enclave is within said interval or not.

9. The method according to claim 7, further comprising:
storing, by the base enclave, the token in the token table when there is at least one position in the token table that is currently not occupied by another token.

10. The method according to claim 7, further comprising, upon not enabling running of the new instance:
determining, by the base enclave, to request the running of the new instance to be stopped or at least limited, and
wherein the base enclave determines to request the running of the new instance to be stopped when all positions in the token table currently are occupied by other tokens.

11. The method according to claim 7, further comprising:
providing, by said another enclave and to the base enclave, a liveness check when running the instance, the liveness check comprising the token;
verifying, by the base enclave, whether the token of the liveness check matches any token in the token table or not; and
reporting, by the base enclave and to said another enclave, a result of the verifying.

12. The method further according to claim 11, further comprising:
stopping, by said another enclave, running of the new instance when the result indicates that the token of the liveness check did not match any token in the token table.

13. The method according to claim 7, further comprising:
determining, by said another enclave, to stop running the new instance;
providing, by said another enclave and to the base enclave, a notification to remove the token from the token table in response thereto; and
removing, by the base enclave, the token from the token table.

14. The method according to claim 6, wherein the token is a random number.

15. The method according to claim 1, wherein the base enclave is initialized with the secure component before receiving the indication from said another enclave.

16. The method according to claim 1, wherein the base enclave is the only enclave of the enclave environment that is enabled to communicate with the secure component.

17. The method according to claim 1, wherein the secure component enforces that there is only one base enclave per application hosted by the execution platform.

18. An execution platform for handling instances of enclaves on the execution platform, the execution platform comprising:
a secure component; and
processing circuitry,
wherein:
the secure component serves as a trusted interface between a trusted platform module of the execution platform and enclaves of an enclave environment on the execution platform, wherein only a single enclave, denoted base enclave, in the enclave environment is enabled to communicate with the secure component; and
the processing circuitry is configured to cause the execution platform to:
receive, by the base enclave, an indication from another enclave in the enclave environment upon start-up of a new instance of said another enclave; and
determine, by the base enclave, to enable continued running of the new instance only when a number of currently running instances of said another enclave is within an interval of allowed number of running instances of said another enclave.

19. An execution platform for handling instances of enclaves on the execution platform, the execution platform comprising:
a secure component;
processing circuitry; and
a storage medium,
wherein:
the secure component serves as a trusted interface between a trusted platform module of the execution platform and enclaves of an enclave environment on the execution platform, wherein only a single enclave, denoted base enclave, in the enclave environment is enabled to communicate with the secure component; and
the storage medium stores instructions that, when executed by the processing circuitry, cause the execution platform to:
receive, by the base enclave, an indication from another enclave in the enclave environment upon start-up of a new instance of said another enclave; and
determine, by the base enclave, to enable continued running of the new instance only when a number of currently running instances of said another enclave is within an interval of allowed number of running instances of said another enclave.

20. An execution platform for handling instances of enclaves on the execution platform, the execution platform comprising:
a secure component;
a receive module; and
a determine module,
wherein:
the secure component serves as a trusted interface between a trusted platform module of the execution platform and enclaves of an enclave environment on the execution platform, wherein only a single enclave, denoted base enclave, in the enclave environment is enabled to communicate with the secure component, the execution platform;

the receive module is configured to cause the base enclave to receive an indication from another enclave in the enclave environment upon start-up of a new instance of said another enclave; and the determine module is configured to cause the base enclave to determine to enable continued running of the new instance only when a number of currently running instances of said another enclave is within an interval of allowed number of running instances of said another enclave.

\* \* \* \* \*